United States Patent [19]
Fadus

[11] Patent Number: 5,186,321
[45] Date of Patent: Feb. 16, 1993

[54] BIODEGRADABLE MULTI-CONTAINER CARRIER

[76] Inventor: Richard F. Fadus, 225 Crescent Cir., Cheshire, Conn. 06410

[21] Appl. No.: 843,928

[22] Filed: Feb. 24, 1992

[51] Int. Cl.$^5$ .................. B65D 71/00; B65D 75/00
[52] U.S. Cl. ................... 206/151; 206/199; 220/DIG. 30
[58] Field of Search .......... 206/139, 145–153, 206/199, 158; 220/DIG. 30

[56] References Cited

U.S. PATENT DOCUMENTS

| | | | |
|---|---|---|---|
| 3,394,800 | 7/1968 | Brackett et al. | 206/196 |
| 3,601,439 | 8/1971 | Poupitch | 294/87.2 |
| 4,190,149 | 2/1980 | Qliff et al. | 206/145 |
| 4,453,630 | 6/1984 | Helms et al. | 206/158 |
| 4,911,288 | 3/1990 | Dantoin, Jr. | 206/139 |
| 5,063,111 | 11/1991 | DiBello | 220/DIG. 30 |

FOREIGN PATENT DOCUMENTS 2363493 3/1978 France .................. 206/151

*Primary Examiner*—William I. Price
*Attorney, Agent, or Firm*—CTC & Associates

[57] ABSTRACT

An improved paperboard multiple can carrier made of multilayered laminated paperboard which has at least two layers of recycled paper and two layers of virgin paper. Tearing of the paperboard is prevented by multiple indentations or notches circumferentially extending around the orifices through which cans and fingers are inserted.

5 Claims, 4 Drawing Sheets

BIODEGRADABLE MULTI-CONTAINER CARRIER

BACKGROUND OF THE INVENTION

Canned and bottled beverages currently on the market generally utilize a multiple unit carrier for the convenience of the stocking personnel and the consumer. This practice has been ongoing for at least fifty years. Originally, compartmented cardboard boxes housed multiple containers. Modifications of the basic box continued for many years and is in use today, particularly for bottles, where it is desirable to maintain separation to prevent breakage. With the advent of canned beverages, breakage no longer was a problem. In addition, cans historically had a bead or circumferential ring at the top which could be used to latch or interconnect with a carrier. The most popular form of such carrier is the plastic yoke type wherein interconnected rings of the proper configuration, with one ring for each container could be stretched over the container top rim forming both a friction fit with the can body and an interference fit below the circumferential ring or bead on the can top.

These yoke type carriers handle the multiple container transport problem very well. However, it has been found that they pose a serious threat to wildlife by entangling the same. Also, these yoke carriers are usually made of polyolefin plastic sheeting which does not degrade and thus is difficult to dispose of.

OBJECT OF THE INVENTION

It is a primary objective of the invention to provide a multiple beverage can carrier which is completely biodegradable.

It is another objective of the invention to provide a multiple beverage can carrier which securely holds two or more beverage cans for convenient transport.

It is yet another objective of the invention to provide a multiple beverage can carrier that can partially be made of recycled materials.

It is yet another objective of the invention to provide a multiple beverage can carrier that in one form is resistant to water yet completely biodegradable.

It is yet another objective of the invention to provide a multiple beverage can carrier that may readily be incinerated without yielding any objectionable odors.

PRIOR ART

A preliminary search for patentability revealed the following U.S. patents:

U.S. Pat. No. 3,394,800—Bracket et al. issued Jul. 30, 1968 "a (paperboard) carrier which completely encloses the product which prevents the bottles from coming into direct contact with each other.

U.S. Pat. No. 3,601,439—Poupitch issued Aug. 24, 1971, assigned to Illinois Tool Works, Inc. "a combined paperboard and film device which will not only grip the underside of the bead of a container (can) but will also provide a protective coating for the entire upper surface of a plurality of containers."The device is "readily disposable and to this end it is proposed to produce a device which is readily combustible".

U.S. Pat. No. 4,190,149—Oliff et al. issued Feb. 26, 1980, assigned to The Mead Corporation. "an article carrier formed from a unitary blank (paperboard) and comprises a top wall with side and end walls diverging downwardly therefrom, multiple neck receiving aperatures formed in the top wall and corner structures intersecting the side and end walls at each corner of the carrier and conforming to the contour of the associated packaged article."

U.S. Pat. No. 4,453,630—Helms et al. issued Jun. 12, 1984, assigned to Container Corporation of America, "a carrier includes a shell formed of relatively thin printable sheet material having molded plastic frame bonded to the underside thereof to reinforce the article receiving openings, the finger openings and corners of the shell."

U.S. Pat. No. 4,911,288—Dantoin, Jr. issued Mar. 27, 1990 "a carrier for two or more sealed cans of the type having a tab fixed by securing means to a lid of each can. A sheet (paperboard) for holding the cans has slot openings spaced apart by the center-to-center distance between the cans. Each slot opening is adapted to receive the tab of one sealed can with the edges of the sheet around each slot being functionally engaged between the tab and lid in an interference fit."

None of the prior art revealed the improvement in the art disclosed by the instant invention.

SUMMARY OF THE INVENTION

A multiple can carrier stamped out of a multiple layered card o paperboard which contains at least two layers of recycled material. Multiple circular orifices are supplied through which cans may be inserted to be both frictionally and structurally retained. In addition, at least two smaller orifices are supplied through which fingers may be inserted to pick up and carry the multiple cans. Each of the can holding orifices have lips circumferentially extending around the orifice. The lips are composed of a series of teeth along the edge extending into the orifice to fit beneath the bead of the top of the can when a can is inserted into the carrier. The shape of the teeth eases insertion of the cans and removal of the same when a slight twisting or slight rotation is applied to the can.

Tearing of the teeth individually and into the cardboard carrier body either during insertion carrying or removal of the cans is prevented by an indentation or series of indentations or notches extending circumferentially around the orifice at the base of the teeth. The smaller finger insertable orifices do not have lips or teeth similar to those for the larger can holding orifices. They do, however, have a series of indentations or notches circumferentially extending around the orifice to prevent tearing of the carrier base. The indentations or notches acting to interfere with the propigation of a tear by distribution of the tear initiating force which if not blocked by the indentation or notch would essentially continue to ultimately split the main body of the carrier. The distribution of force coming about first because of the densification of the laminated card or paperboard at the indentation or notch and secondly by imparting resilience to the paperboard laminate around the orifice.

The can carrier base including orifices, lips, teeth and indentations are formed by conventional paper-cardboard cutting/stamping dies. In this instance it may be necessary to either use a compound cutting die sequentially cutting the orifice, indentations and finally teeth or by use of sequentially stationed multiple dies The choice being determined by final cost/volume considerations.

The laminated card or paperboard of the instant invention is made up of multiple layers. The outer layers are of virgin long fiber paper and the inner layers of short fiber recycled paper. The outer layers of long fiber paper may have a coating applied thereon to impart a degree of water or moisture resistance. Such coatings should not be of nonbiodegradable polymeric materials such as polyethylene, polyvinylchloride or petroleum waxes which do not contain reactive groups along their polymer chains. Instead, materials such as the high molecular weight CARBO WAX (Union Carbide Corp.) which is a methoxypolyethyleneglycol polymer will be useful in the instant invention because these polymers are biodegradable and will impart a degree of water resistance. Alternatively, other well known resins with reactive sites situated along the polymer chain may be used as a coating particularly those with substantial residual unsaturation which is easily attacked by bacteria. The multiple layers of the laminated paperboard may be formed either by use of adhesive to bond the individually formed layers or may be formed by pressing or coleveling individually formed layers while still wet in the paperboard press, eliminating the need for adhesive.

The lips and teeth surrounding the large orifices are slightly beveled during the cutting or stamping operation. This slight upward bend assists in placing the carrier over the tops of cans to interlock with the upper bead on the can. This slight upward bend of the teeth also acts to interlock the die stamped carriers when stacked to prevent slipping of individual carriers thus eliminating the need for discrete packaging of the stacks. Also the bevel acts as an indexin guide when the stacked die cut carriers are loaded into a packaging machine.

A version which employs a lighter weight paperboard is obtained by extending the sides of the basic carrier, equipping these sides with perforated fold lines and tabs. When these extended sides are folded and tucked under the carrier base and the tabs are inserted into slits to lock the side in place. In this position the folded under sides brace against each other to rigidify the thinner lighter weight carrier.

DETAILED DESCRIPTION

Figure 1:
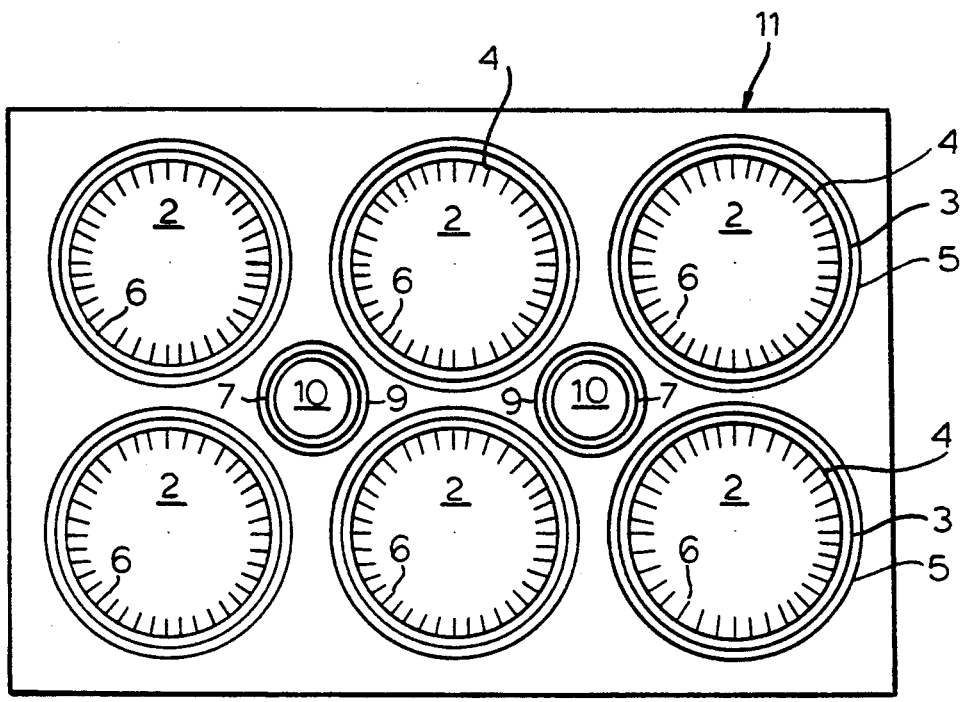
FIG. 1 is a diagramatic view of the basic carrier.

FIG. 1 is a schematic view of one version of the improved multilayered laminated paperboard can carrier 11. Large can retaining orifices 2 have lips 4 which have a series of teeth 6 extending circumferentially around the orifice. Tear resistance is imparted by an indentation or notch 3 at the base of the teeth and at least one additional indentation or notch 5 adjacent to the indentation at the base of the teeth both extending circumferentially around the orifice. The indentations or notches acting to deter propagation of a tear which might be initiated during the transport of the carrier with filled cans hanging therefrom.

Smaller orifices 10 have at least two indentations 7, 9 extending circumferentially around the orifice to prevent propagation of a tear which might originate when fingers are inserted into the orifice to pick up a carrier base containing six filled beverage cans.

Location of can retaining orifices in the carrier is determined by the type and shape of the can to be carried. Optimum retention with limited buckling of the carrier is obtained by limiting the distance from can to can in any direction to approximately ⅛ inch (5 mm). Can to can distance greater than ⅛ inch (5 mm) will require a heavier stock laminated paperboard while lesser distance between cans is difficult to control in automatic packaging machinery.

Figure 2:
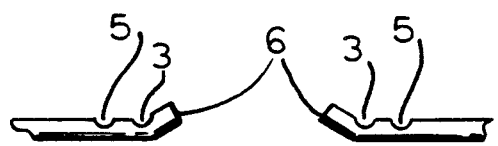
FIG. 2 is a cross section view of one die stamped orifice showing bevel of teeth and creases.

The enlarged cross section view of teeth FIG. 2 illustrates the upward bevel that is induced during die cutting and first indentation or notch 3 located at the base of teeth 6 and second indentation or notch 5 located adjacent to the first indentation or notch. Indentations or notches 3 and 5 should compress the multilayered laminated paperboard 40% to 60% but preferably 50% of the thickness of the paperboard. Lesser compression does not offer the resiliency to effectively stop tear. Indentations or notches may be separated by 1/32 to 1/16 inch (1.25 mm to 2.5 mm) but at minimum the thickness of the laminated paperboard.

Figure 3:
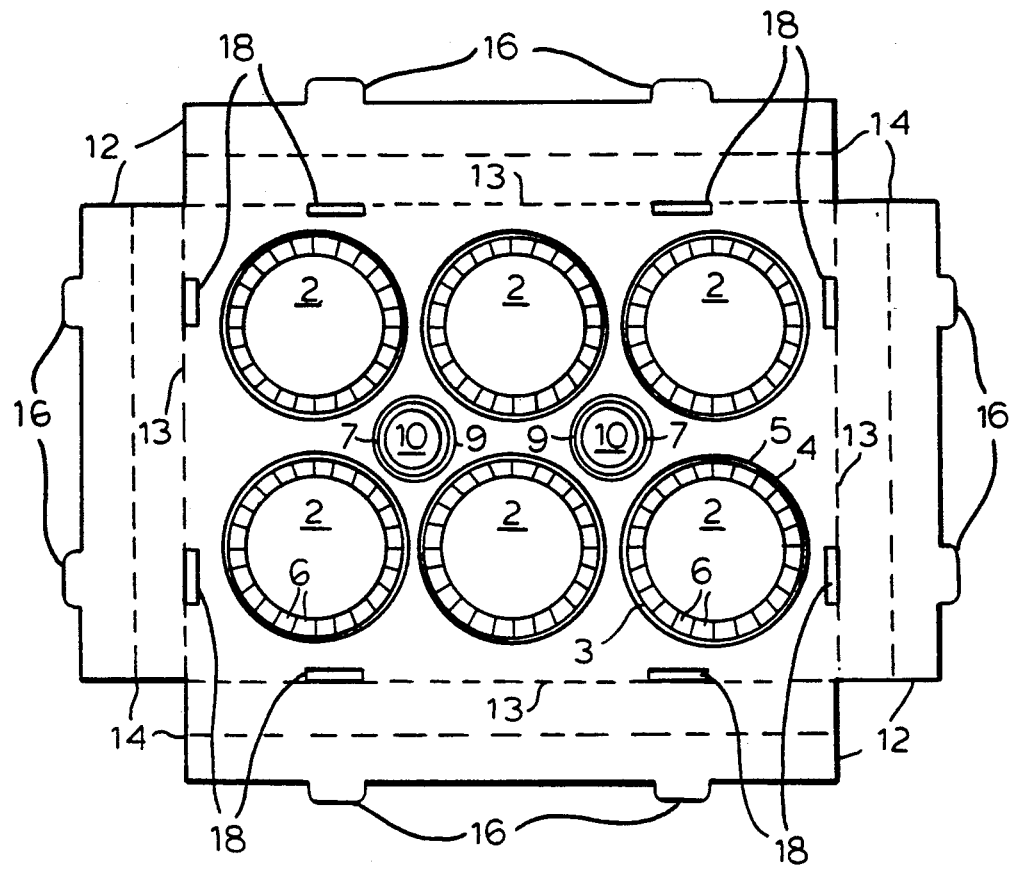
FIG. 3 is a diagramatic view of the lighter weight laminated paperboard version with fold up reinforcing sides and tabs.
Figure 4:
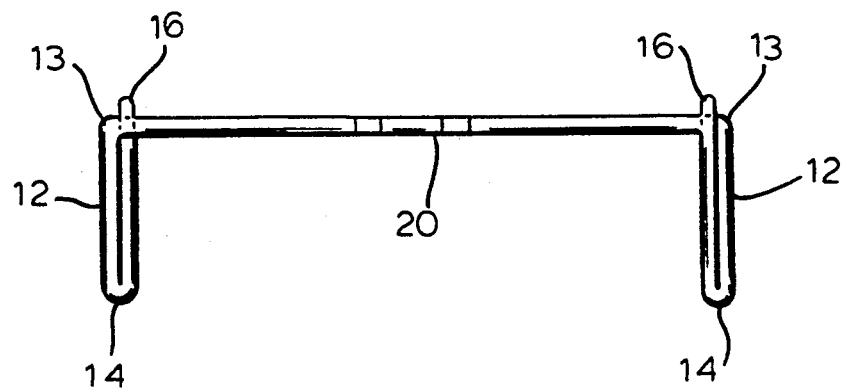
FIG. 4 is an end view of the lighter weight laminated paperboard with two sides folded in place with tabs inserted.

FIG. 3 is a schematic view of a self-reinforcing version of the carrier which may utilize a thinner or lighter grade of paperboard laminate. It has large orifices 2 and smaller orifices 10, each larger can retaining orifice has a lip extending into the orifice. The lips 4 have teeth 6 to engage the upper bead on a can retained therein. Teeth 6 have an indentation or notch 3 placed at their base and at least one other indentation or notch 5 located adjacent thereto. In addition, sides of carrier 20 are extended forming fold over partitions 12 each having fold lines 13 and 14 perforated or creased and two tabs 16. Two slots 18 are cut into the intersection of carrier and extended side. Extended sides 12 are first folded downward along fold line 13 then inward and upward along fold line 14 until tabs 16 are inserted and locked in slots 18. The folded under sides FIG. 4 acting to prevent buckling of the lighter weight paperboard carrier by contact with the adjacent folded under side without the need to reinforce or interlock the corners formed by the folded under sides.

Figure 5:
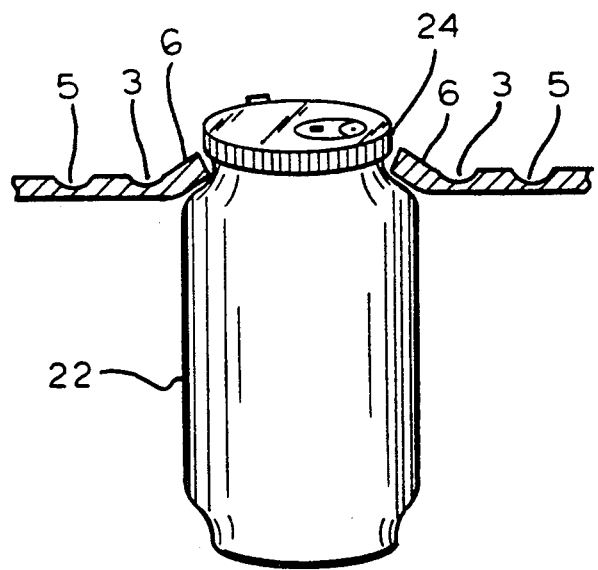
FIG. 5 is a cross section of one of the orifices with a beverage can suspended therein.

Orifice 2 with lips and teeth and first and second indentations or notches 3 and 5 are shown in cross section FIG. 5 in position on beverage can 22 and bead 24 retaining and suspending can 22 by teeth 6 being engaged under bead 24.

Figure 6:
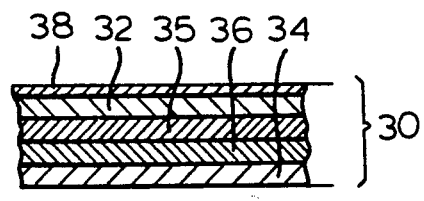
FIG. 6 is a cross section of the multilayered paperboard.

Multilayered paper laminate 30 is shown in cross section in FIG. 6. Outer virgin long fiber paper layers 32 and 34 being laminated onto two recycled short fiber papers 35 and 36. Top outer layer 32 has water resistant but biodegradable coating 38 affixed thereto.

The thickness of the individual layers of the laminate may vary according to the skill in the art. However, the two layers of recycled paper should be at least one half of the total thickness of the laminate but to maximize the use of recycled paper preferably should be in the range of 70% of the total laminate thickness. Total laminate thickness may be as thin as 0.020 inch (0.05 mm) in the version with fold under sides and locking tabs and as thick as 0.040 inch (1 mm) in the carrier without side reinforcement.

Figure 7:
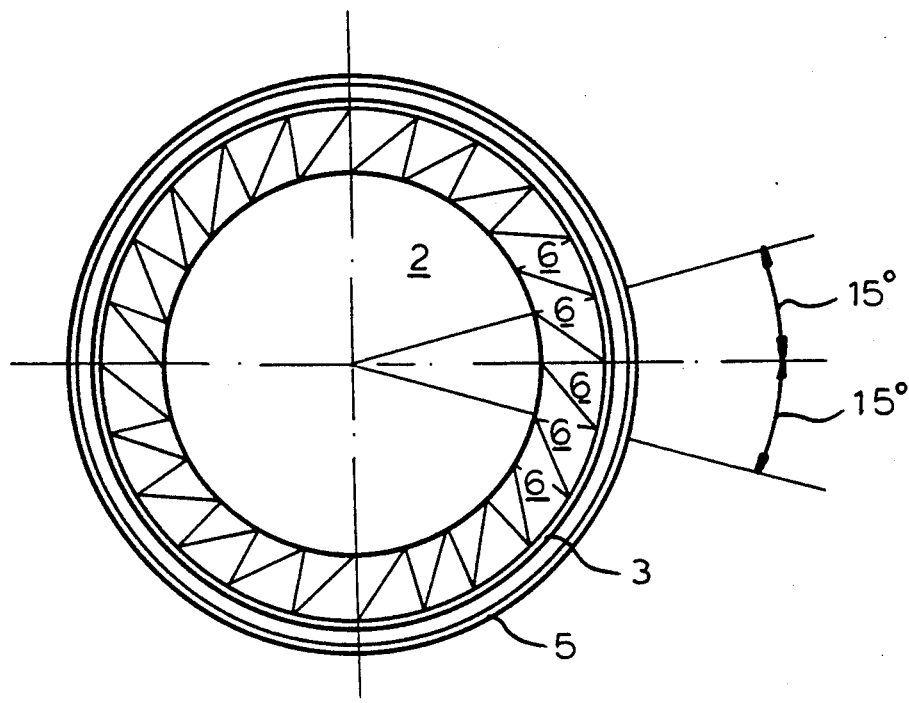
FIG. 7 is a blowup of one of the can retaining orifices and 7A is an illustration of a tooth.
Figure 7A:
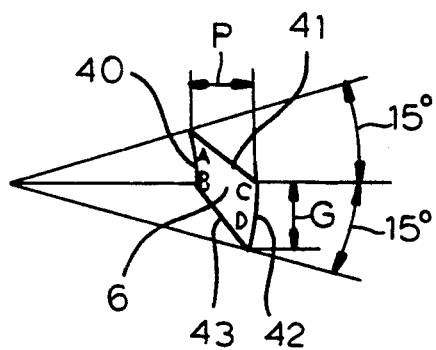

FIGS. 7 and 7A are enlarged views of a large can retaining orifice illustrating the shape of teeth thereof. Indentation or notch 3 can be seen at the base of teeth 6 and second tear stop indentation or notch 5 adjacent thereto. Enlarged tooth 6 spacing around orifice is based on a circumferential radius of 15° or 24 teeth per orifice. Tooth 6 has circumferential angles A, B, C and D and straight sides 41 and 43 and circumferential sides 40 and 42.

The width G of tooth 6 may range from 0.094 inch to 0.225 inch (3,70 mm to 8.9 mm) but preferably 0.125 inch (4.94 mm). Tooth length P may range from 0.125 inch (4.94 mm) to 0.375 inch (14.8 mm) but preferably in the range of 0.1875 inch (7.4 mm)±0.03725 (1.5 mm) to achieve optimum ease of inserting and removing a can yet optimum retaining power on the bead and body of a can.

Numerous modifications to the embodiments described will be apparent from the foregoing description and drawings. It is not intended that the invention described be limited to the description herein but is defined in the claims which follow:

What I claim is:

1. An improved biodegradable multiple can carrier body stamped out of paperboard with multiple circular orifices into which cans are inserted to be both frictionally and structurally retained and at least two other smaller orifices through which fingers may be extended wherein the improvement comprises a multilayered laminated paperboard, said multilayers made up of inner and outer layers said inner layers being made up of short fiber recycled paper, said outer layers being made up of long fiber virgin paper; said multiple orifices having lips extending circumferentially around said orifice, said lips are composed of a series of teeth extending into said orifices, said orifices having at least two indentations extending circumferentially around said orifice, the first of said indentations being located at the intersection of said teeth and said main carrier body, the second of said indentations located adjacent to said first indentation in said main carrier body, said multiple layered laminated paperboard, said teeth and said indentations acting in concert to retain said cans and to prevent tearing of said improved biodegradable multiple can carrier.

2. An improved biodegradable can carrier of claim 1 wherein said outer layer of said laminated paperboard is coated with a biodegradable water resistant coating.

3. An improved biodegradable can carrier base of claim 1 wherein said smaller orifices have circumferentially extending indentations around the orifice to prevent tearing of said laminated paperboard.

4. An improved biodegradable can carrier base of claim 1 which is of lighter weight laminated paperboard; said lighter weight paperboard being rigidified by fold over sides, said fold over sides having perforated fold lines and tabs, said tabs being inserted into slits in the carrier base; said folded over sides brace against each other to rigidify said lighter weight laminated paperboard.

5. An improved biodegradable can carrier base of claim 1 wherein said teeth are beveled upward to enhance insertion and retention of said cans.

* * * * *